United States Patent
Kollmitzer et al.

(10) Patent No.: US 10,921,206 B2
(45) Date of Patent: Feb. 16, 2021

(54) PACKAGED MEMS DEVICE WITH DISTURBANCE COMPENSATION

(71) Applicant: Infineon Technologies AG, Neubiberg (DE)

(72) Inventors: Benjamin Kollmitzer, Graz (AT); Franz Michael Darrer, Graz (AT); Philipp Greiner, Graz (AT); Marcus Edward Hennecke, Graz (AT); Walter Schuchter, Graz (AT); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 236 days.

(21) Appl. No.: 15/999,017

(22) Filed: Aug. 20, 2018

(65) Prior Publication Data
US 2019/0064026 A1    Feb. 28, 2019

(30) Foreign Application Priority Data

Aug. 24, 2017 (DE) .................... 10 2017 214 846.2

(51) Int. Cl.
*G01L 19/14*       (2006.01)
*G01L 9/06*        (2006.01)
*G01L 19/06*       (2006.01)

(52) U.S. Cl.
CPC .............. *G01L 19/146* (2013.01); *G01L 9/06* (2013.01); *G01L 19/06* (2013.01)

(58) Field of Classification Search
CPC .......... G01L 19/146; G01L 19/06; G01L 9/06
(Continued)

(56) References Cited

U.S. PATENT DOCUMENTS 6,234,027 B1 * 5/2001 Schatz ................. G01L 9/0054
                                                        73/754
6,255,728 B1 * 7/2001 Nasiri ................. G01L 19/0038
                                                        257/666
(Continued)

FOREIGN PATENT DOCUMENTS

DE          19957556 A1    5/2001
DE      102007027274 A1   12/2008
(Continued)

*Primary Examiner* — Nathaniel T Woodward
(74) *Attorney, Agent, or Firm* — Harrity & Harrity, LLP (57) ABSTRACT

Disclosed is an apparatus which has, among other things, a MEMS device with a first measurement arrangement for capturing a measurement variable ($X_1$) based on a physical variable, which has a useful variable component ($N_1$) and a first disturbance variable component ($Z_1$), and a second measurement arrangement for capturing a second disturbance variable component ($Z_2$). The apparatus furthermore has a disturbance compensation circuit which is configured to combine the second disturbance variable component ($Z_2$) and the measurement variable ($X_1$) with one another and to obtain a disturbance-compensated measurement variable ($X_{comp}$). The MEMS device is arranged in a housing, wherein the MEMS device is in immediate mechanical contact with the housing by way of at least 50% of a MEMS device surface.

20 Claims, 6 Drawing Sheets

(58) Field of Classification Search
USPC .......................................................... 73/708
See application file for complete search history.

(56) References Cited

U.S. PATENT DOCUMENTS

| | | | | |
|---|---|---|---|---|
| 7,010,984 | B2* | 3/2006 | Krog ..................... | G01L 13/025 |
| | | | | 73/716 |
| 9,021,887 | B2* | 5/2015 | Kalz ......................... | B81B 7/02 |
| | | | | 73/777 |
| 2006/0025955 | A1* | 2/2006 | Kurtz ..................... | G01N 9/266 |
| | | | | 702/117 |
| 2013/0087863 | A1 | 4/2013 | Chiou | |
| 2014/0165708 | A1 | 6/2014 | Konrath et al. | |
| 2016/0265999 | A1* | 9/2016 | Van Der Wiel ......... | G01L 19/04 |
| 2016/0299025 | A1 | 10/2016 | Chen et al. | |

FOREIGN PATENT DOCUMENTS

| | | |
|---|---|---|
| DE | 102013020388 A1 | 6/2014 |
| DE | 112012004168 T5 | 6/2014 |
| DE | 102016202906 A1 | 10/2016 |

* cited by examiner

PACKAGED MEMS DEVICE WITH DISTURBANCE COMPENSATION

RELATED APPLICATION

This application claims priority under 35 U.S.C. § 119 to German Patent Application No. 102017214846.2, filed on Aug. 24, 2017, the content of which is incorporated by reference herein in its entirety.

TECHNICAL FIELD

The present disclosure relates to an apparatus having a packaged MEMS device having a disturbance compensation circuit, for example for compensating mechanical stress on a piezoresistive pressure sensor.

BACKGROUND

In general, sensors can be inherently sensitive with respect to mechanical loads, for example piezoresistive pressure sensors. The capturing principle thereof is based on the piezoresistive effect, which describes the change in the resistivity of a material with respect to mechanical stress.

Mechanical stress can be caused for example by an applied pressure, which deflects a diaphragm. The mechanical stress that is caused by a diaphragm deflection of this type can be converted into an electric voltage by way of piezoresistors.

However, pressure differences acting on the diaphragm are generally not the only cause of mechanical stress. Any external force acting on a sensor chip can change the mechanical stress acting on the aforementioned piezoresistive elements, resulting in the output of such a sensor possibly being influenced. Such forces can be caused, for example, by thermomechanical loading as a result of the soldering process, from different thermal expansion of components of an integrated circuit (casting compound, semiconductor material, chip wires etc.), from swelling due to atmospheric humidity or by other external forces.

In some TPMS pressure sensors (TPMS: tire pressure monitoring system), the sensitive elements are typically mechanically decoupled using soft, gel-type materials such as silicone adhesives and what are known as glob top materials. This reduces the undesired mechanical stresses that are introduced into the sensitive elements. However, the use of such soft materials makes installation difficult and increases installation costs. For this reason, it would be desirable to reduce the influence of undesired mechanical stresses despite simpler housing concepts, and to be able to reduce the production costs while keeping the installation complexity low and manufacturing yield high.

SUMMARY

According to one embodiment, an apparatus includes a MEMS device with a first measurement arrangement for capturing a measurement variable based on a physical variable, which has a useful variable component and a first disturbance variable component, and a second measurement arrangement for capturing a second disturbance variable component. The apparatus further includes a disturbance compensation circuit which is configured to combine the second disturbance variable component and the measurement variable with one another and to obtain a disturbance-compensated measurement variable. The MEMS device (14) is arranged in a housing (15), and the MEMS device (14) is in immediate mechanical contact with the housing (15) by way of at least 50% of a MEMS device surface ($17_1$, $17_2$).

Further conceivable example embodiments are described in the dependent claims.

BRIEF DESCRIPTION OF THE DRAWINGS

A few example embodiments are illustrated in the drawing and will be explained in more detail below with reference to the individual figures. In the figures.

DETAILED DESCRIPTION

Figure 1:
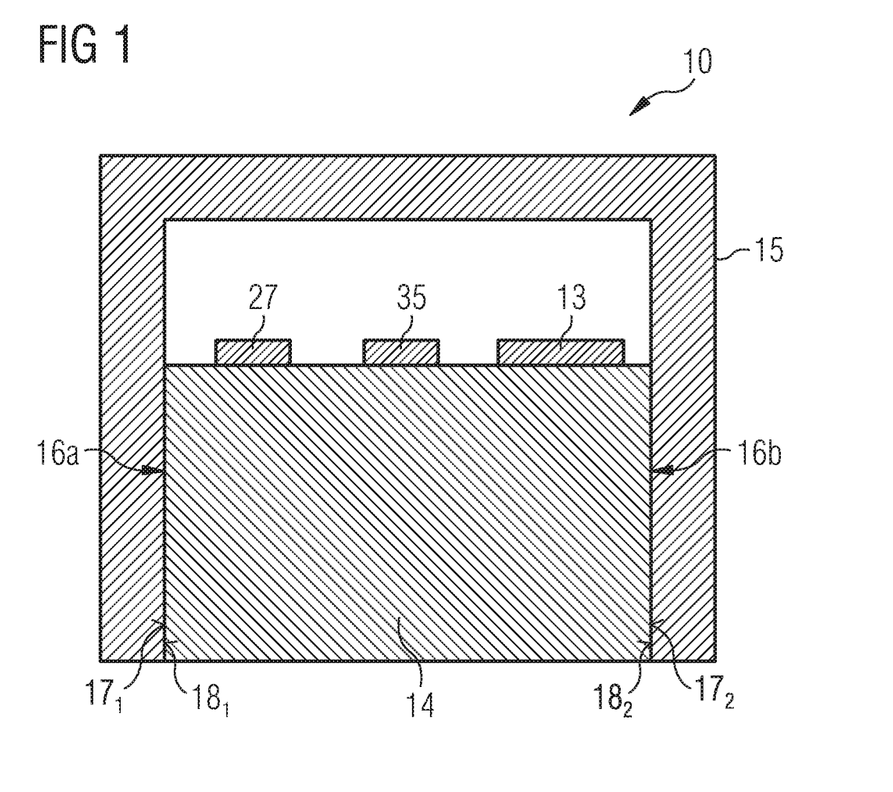
FIG. 1 shows a sectional illustration of an apparatus in accordance with an example embodiment.

FIG. 1 shows the cross section of an example embodiment of an apparatus 10 in accordance with the present disclosure.

The apparatus 10 has a MEMS device 14 (MEMS—microelectromechanical system). The MEMS device 14 has a first measurement arrangement 27 for capturing a measurement variable $X_1$ that is based on a physical variable. This measurement variable $X_1$ can have a useful variable component $N_1$ and a first disturbance variable component $Z_1$.

The MEMS device 14 furthermore has a second measurement arrangement 35. The second measurement arrangement 35 is embodied to capture at least one second disturbance variable component $Z_2$. In other words, the second measurement arrangement 35 can be configured to capture a second measurement variable $X_2$, which is based on a physical variable. This second measurement variable $X_2$ in turn can have the aforementioned second disturbance variable component $Z_2$.

The MEMS device 14 additionally has a disturbance compensation circuit 13. The disturbance compensation circuit 13 is configured to combine the second disturbance variable component $Z_2$ and the measurement variable $X_1$ captured using the first measurement arrangement 27 with one another to obtain a disturbance-compensated measurement variable $X_{comp}$.

In other words, the disturbance compensation circuit 13 can be configured, for example, to subtract the second disturbance variable $Z_2$, captured using the second measurement arrangement 35, from the measurement variable $X_1$, captured using the first measurement arrangement 27, or to add it to the latter, depending on the mathematical sign of said second disturbance variable. The measurement variable $X_1$ captured using the first measurement arrangement 27 can thus be reduced, or compensated, by the absolute value of the second disturbance variable $Z_2$. The result is a disturbance-compensated measurement variable $X_{comp}$, which has a lower dependence with respect to the disturbance variable $Z_2$ as compared to the first measurement variable $X_1$. Within the meaning of the present disclosure, this is also referred to as disturbance compensation.

Mathematically, this can be expressed, for example, as follows:

$$X_{comp} = X_1 - Z_2, \text{ wherein } X_1 = N_1 + Z_1$$

Further mathematical details relating to this disturbance compensation will be explained in more detail below.

As FIG. 1 additionally shows, the MEMS device 14 is arranged in a housing 15. The MEMS device 14 here is in immediate mechanical contact with the housing 15 by way of at least 50% of a MEMS device surface $17_1$, $17_2$.

In other words, the MEMS device 14 has at least one MEMS device surface $17_1$, $17_2$. A MEMS device surface is understood to mean the geometric surface of the MEMS device 14. If the MEMS device 14 had, for example, a cube-shaped structure, the MEMS device 14 would have six geometric surfaces overall, which in this case would be referred to as MEMS device surfaces. The total MEMS device surface would then have six individual MEMS device surfaces. Consequently, the total MEMS device surface 17 can have or include a plurality of individual device surfaces $17_1$, $17_2$ or consist of a plurality of individual device surfaces $17_1$, $17_2$.

As mentioned at the outset, the MEMS device 14 is in immediate mechanical contact with the housing 15 by way of at least 50% of a MEMS device surface $17_1$, $17_2$. This is illustrated in FIG. 1 by way of the reference signs 16a and 16b.

The MEMS device 14, which in FIG. 1 has a rectangular embodiment merely by way of example, has a first MEMS device surface $17_1$ and a second MEMS device surface $17_2$. The housing 15 has a first and a second housing surface $18_1$, $18_2$ that are arranged in the housing interior, i.e. face the MEMS device 14. As can be seen, the first MEMS device surface $17_1$ is in direct mechanical contact with the first housing surface $18_1$ of the housing 15. Here, at least 50% of the first MEMS device surface $17_1$ is in direct mechanical contact with the first housing surface $18_1$ of the housing 15.

In the case that is shown in FIG. 1 merely by way of example, the first MEMS device surface $17_1$ is in direct mechanical contact entirely, i.e. to 100%, with the first housing surface $18_1$ of the housing 15, and the second MEMS device surface $17_2$ is in direct mechanical contact entirely, i.e. to 100%, with the second housing surface $18_2$ of the housing 15. In more general terms, example embodiments can make provision for a MEMS device surface $17_1$, $17_2$ to be entirely, i.e. to 100%, in direct mechanical contact with the housing 15.

Further example embodiments make provision for the MEMS device 14 to be in direct mechanical contact with the housing 15 by way of at least 75% of a MEMS device surface $17_1$, $17_2$, or by way of at least 80% of a MEMS device surface $17_1$, $17_2$, or by way of at least 90% of a MEMS device surface $17_1$, $17_2$. Further example embodiments in turn make provision for the MEMS device 14 to be in immediate mechanical contact with the housing 15 by way of at least 50% or 75% or 80% or 90% of its total MEMS device surface 17. As mentioned earlier, the total MEMS device surface 17 is composed of the individual MEMS device surfaces $17_1$, $17_2$ etc. The number of the individual MEMS device surfaces $17_1$, $17_2$ etc. depends on the geometry or shape of the MEMS device 14.

Further example embodiments in turn make provision for the MEMS device 14 to be entirely in immediate mechanical contact with the housing 15 by way of its total MEMS device surface 17, i.e. to 100%.

Direct mechanical contact is understood to mean that the corresponding MEMS device surface $17_1$, $17_2$ adjoins the housing 15 (or a housing surface $18_1$, $18_2$) directly and immediately and touches it. In other words, no further additional material is arranged between the corresponding MEMS device surface $17_1$, $17_2$ and the housing 15 (or the corresponding housing surface $18_1$, $18_2$).

For example, no additional soft or elastic material, which is typically used to mechanically decouple mechanical stress acting on the MEMS device 14, as was described at the outset, is arranged between the MEMS device 14 and the housing 15. With the concept described here, it is now possible for example to dispense with the aforementioned application of glob top material between the MEMS device 14 and the housing 15. It is also possible to dispense with other soft or elastic materials, such as silicone, silicone adhesive or gel.

The above-described elastic or soft materials can have moduli of elasticity (Young's moduli) of less than 100 MPa. In contrast, the housing 15 can be harder or more inelastic compared to said soft or elastic materials, e.g. glob top. Example embodiments make provision for the housing 15 to have a material having a Young's modulus of at least 100 MPa. Said material can include here for example a multiplicity of customary plastics, which have a rigid structure and can therefore also be referred to as hard plastics.

Glob top materials used in installation processes, on the other hand, have a Young's modulus of approximately 30 kPa and are consequently up to five orders of magnitude softer than the housing 15 described here.

Further example embodiments make provision for the housing 15 to have a material having a Young's modulus of at least 1000 MPa. Said material can be, for example, polyethylene (PE) or polypropylene (PP).

Further example embodiments in turn make provision for the housing 15 to have a material having a Young's modulus of at least 3 GPa. Said material can be, for example, thermoplastic polyester (PET), polyvinyl chloride (PVC), polyetherimide (PEI), polyamide or Plexiglas or acrylic glass (PMMA).

Further example embodiments in turn make provision for the housing 15 to have a material having a Young's modulus of at least 10 GPa, or even at least 25 GPa.

The above-mentioned materials can be, for example, housing casting compounds. The latter are applied onto the MEMS device 14 and, after curing, form a hard housing 15 around the MEMS device 14. In other words, the MEMS device 14 can be encapsulated in such a housing casting compound.

What is proposed with the concept introduced here is, among others, to omit the previously explained glob top process and instead to capture unwanted mechanical stress and correct it. Measurement of the mechanical stress in the sensor chip can be done in various ways, as will be described in more detail below.

Pressure sensors will be mentioned as an example below for the MEMS device 14. However, the MEMS device 14 can also include another sensor for capturing a measurement variable based on a physical variable.

Figure 2A:
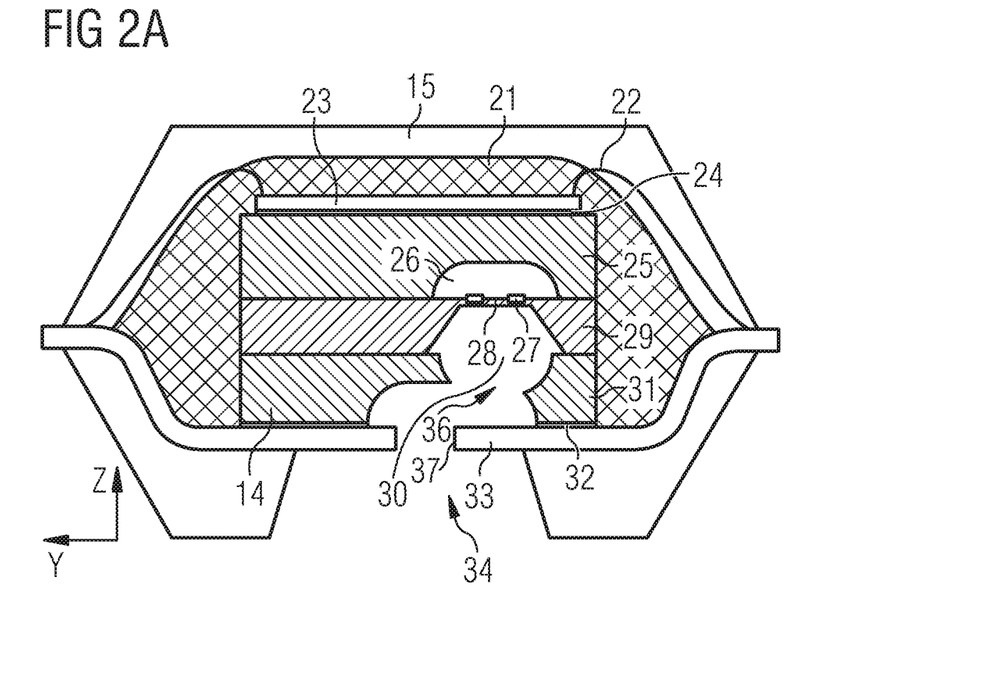
FIG. 2A shows a sectional illustration of an apparatus with a soft or elastic material between housing and device.

For example, FIG. 2A shows a pressure sensor 14, which is arranged in a housing 15. A glob top material 21 is arranged between the pressure sensor 14 and the housing 15. For clarification purposes, the glob top material 21 is shown here with cross hatching.

The pressure sensor 14, which is shown here merely by way of example, consists of a silicon layer 29, which is sandwiched by two glass layers 25 and 31. In other words, the silicon layer 29 shown is arranged between a first glass layer 25 and a second glass layer 31. Formed on one side of the silicon layer 29 in the first glass layer 25 is a reference cavity 26.

The side of the second glass layer 31 that is opposite the silicon layer 29 can be arranged on a lead frame 33 by way of an adhesive 32.

The lead frame 33 in turn can be connected rigidly to the housing 15, as is depicted. On the side of the pressure sensor 14 that is opposite the lead frame 33, a circuit 23, for example an ASIC, is arranged by way of an adhesive 24. The circuit 23 is coupled to the lead frame 33 by way of bond wires 22. The circuit 23 can have, for example, the disturbance compensation circuit 13.

The pressure sensor 14 and the housing 15 each have a fluid port 30, 34, wherein both are fluidically coupled together. For example, the second glass layer 31 of the pressure sensor 14 has an opening 36, which extends throughout the second glass layer 31. Said opening 36 extends from the side of the second glass layer 31 that faces the lead frame 33 all the way to the side of the second glass layer 31 that faces the silicon layer 29.

The silicon layer 29 has, at least over a section in a region 28, a thin rear on a side that faces the first, or upper, glass layer 25, as compared to the remaining total thickness of the silicon layer 29. This region 28 having a thin rear can form a diaphragm, in this example a silicon diaphragm 28. Arranged on said diaphragm 28 is a first measurement arrangement 27. The first measurement arrangement 27 can have pressure-measuring elements, such as piezoresistive elements.

The opening 36, which is formed in the second glass layer 31, and the cavity, which is produced by the thin rear of the silicon layer 29 below the diaphragm 28, together form the fluid port 30 of the pressure sensor 14.

The housing 15 has an opening 34, which can also be referred to as the fluid port 34 of the housing 15, on the side that faces the fluid port 30 of the pressure sensor 14. An opening 37 can likewise be provided in the lead frame 33 if necessary. Said opening 37 fluidically connects the fluid port 30 of the pressure sensor 14 to the fluid port 34 of the housing 15.

In this way, ambient air can flow, for example, from the environment through the fluid port 34 of the housing 15, through the opening 37 in the lead frame 33 and through the fluid port 30 of the pressure sensor 14 to the diaphragm 28. The diaphragm 28 is deflected, and this deflection can then in turn be captured by way of the first measurement arrangement 27 (e.g. piezoresistive elements).

However, with this pressure measurement, disturbances may occur. These disturbances can be caused, for example, by mechanical stresses acting on the pressure sensor 14 or the housing 15. It is desirable to reduce or compensate these disturbances in order to obtain a result of the pressure measurement which is as close to correct as possible.

In the example depicted in FIG. 2A, this is attained by mechanically decoupling the pressure sensor 14 from the housing 15. To this end, as mentioned before, glob top material 21 is arranged between the pressure sensor 14 and the housing 15. In order to decouple mechanical stress acting on the housing 15 from the pressure sensor 14 as much as possible, the glob top material should be as soft or elastic as possible. Mechanical decoupling using glob top material works well. However, the application of the glob top material is complicated and expensive, as described earlier.

Figure 2B:
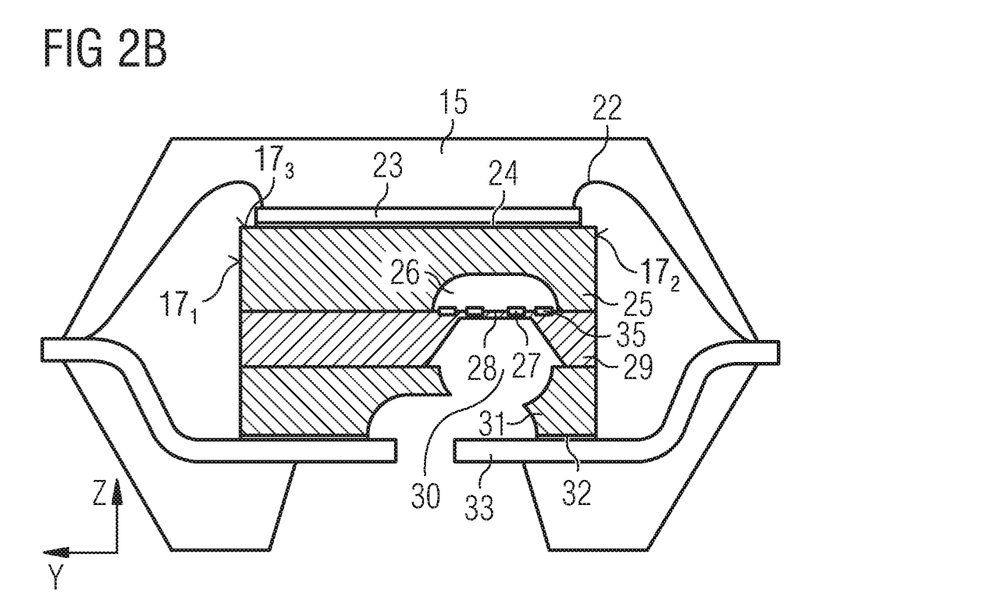
FIG. 2B shows a sectional illustration of an apparatus in accordance with an example embodiment.

FIG. 2B shows an alternative implementation of the pressure sensor 14 described previously with reference to FIG. 2A, wherein identical parts performing the same function are provided with the same reference signs. For the description of said identical parts, reference is therefore made to the above paragraphs.

As compared to the pressure sensor 14 shown in FIG. 2A, the example embodiment depicted in FIG. 2B shows no glob top material between the pressure sensor 14 and the housing 15. Instead, the pressure sensor 14 is in direct or immediate mechanical contact with the housing 15 by way of at least 50% of a device surface $17_1$.

In the example embodiment depicted in FIG. 2B, the pressure sensor 14 is entirely, i.e. to 100%, in direct mechanical contact with the housing 15 by way of a first device surface $17_1$ and by way of an opposite second device surface $17_2$. Accordingly, no soft or elastic material, such as glob top material, is arranged between the pressure sensor 14 and the housing 15.

As described before, a circuit 23 is arranged on a third device surface $17_3$, which in this case can also be referred to as an upper side of the pressure sensor 14. The sections of the third device surface $17_3$ which are not covered by the circuit 23 can likewise be in direct mechanical contact with the housing 15.

As was previously mentioned in the section dealing with Young's moduli, the housing material can be, for example, a casting compound. The pressure sensor 14, or the MEMS device 14, can be entirely encapsulated in this casting compound, which, after curing, forms a housing 15. This is a simple way of bringing the housing 15 into direct mechanical contact with the MEMS device 14.

As mentioned, the pressure sensor is here described merely by way of example as one of multiple conceivable implementations of the MEMS device 14. In a pressure sensor of this type, for example the above-described diaphragm 28 forms a mechanically deflectable movable measurement structure for capturing the physical variable "pressure." The piezoresistive elements 27 are here likewise to be understood merely as one possible example embodiment of the first measurement arrangement 27 for capturing a measurement variable based on said physical variable "pressure."

In the example embodiment depicted in FIG. 2B, the pressure sensor 14 thus has a diaphragm 28, which reacts to pressure changes and undergoes a corresponding deflection. Said deflection of the diaphragm 28 can be captured by way of the first measurement arrangement 27. To this end, the first measurement arrangement 27 can thus have, for example, a first number of piezoresistive elements.

In other words, the MEMS device 14 in this example embodiment has a mechanically deflectable movable measurement structure 28 for capturing the physical variable, wherein an absolute value of a mechanical deflection of the movable measurement structure 28 is capturable by way of the first measurement arrangement 27.

The example embodiment depicted in FIG. 2B furthermore differs from the example depicted in FIG. 2A in that the MEMS device 14 has a second measurement arrangement 35. This second measurement arrangement 35 is embodied to capture a second disturbance variable component $Z_2$.

To this end, the second measurement arrangement 35 can have, for example, a second number of piezoresistive elements. The first number of piezoresistive elements of the first measurement arrangement 27 and the second number of piezoresistive elements of the second measurement arrangement 35 can be identical. For example, in each case one piezoresistive element can be provided in the two measurement arrangements 27, 35. However, it is likewise conceivable for two or more piezoresistive elements per measurement arrangement 27, 35 to be provided. However, the first number of piezoresistive elements of the first measurement arrangement 27 and the second number of piezoresistive elements of the second measurement arrangement 35 can also deviate from one another. That is to say that the first measurement arrangement 27 can have, for example, more or fewer piezoresistive elements than the second measurement arrangement 35.

As can be seen in FIG. 2B, the first measurement arrangement 27 can be arranged at the movable measurement structure 28. In the example of the depicted pressure sensor 14, for example the one or more piezoresistive elements of the first measurement arrangement 27 can consequently be arranged at the diaphragm 28. The second measurement arrangement 35, by contrast, can be arranged around the movable measurement structure 28, and optionally not at the movable measurement structure 28, but at an immovable section of the MEMS device 14. In the example of the depicted pressure sensor 14, for example the one or more piezoresistive elements of the second measurement arrangement 35 can consequently be arranged around the movable diaphragm 28, and optionally not at the movable diaphragm 28.

Figure 3:
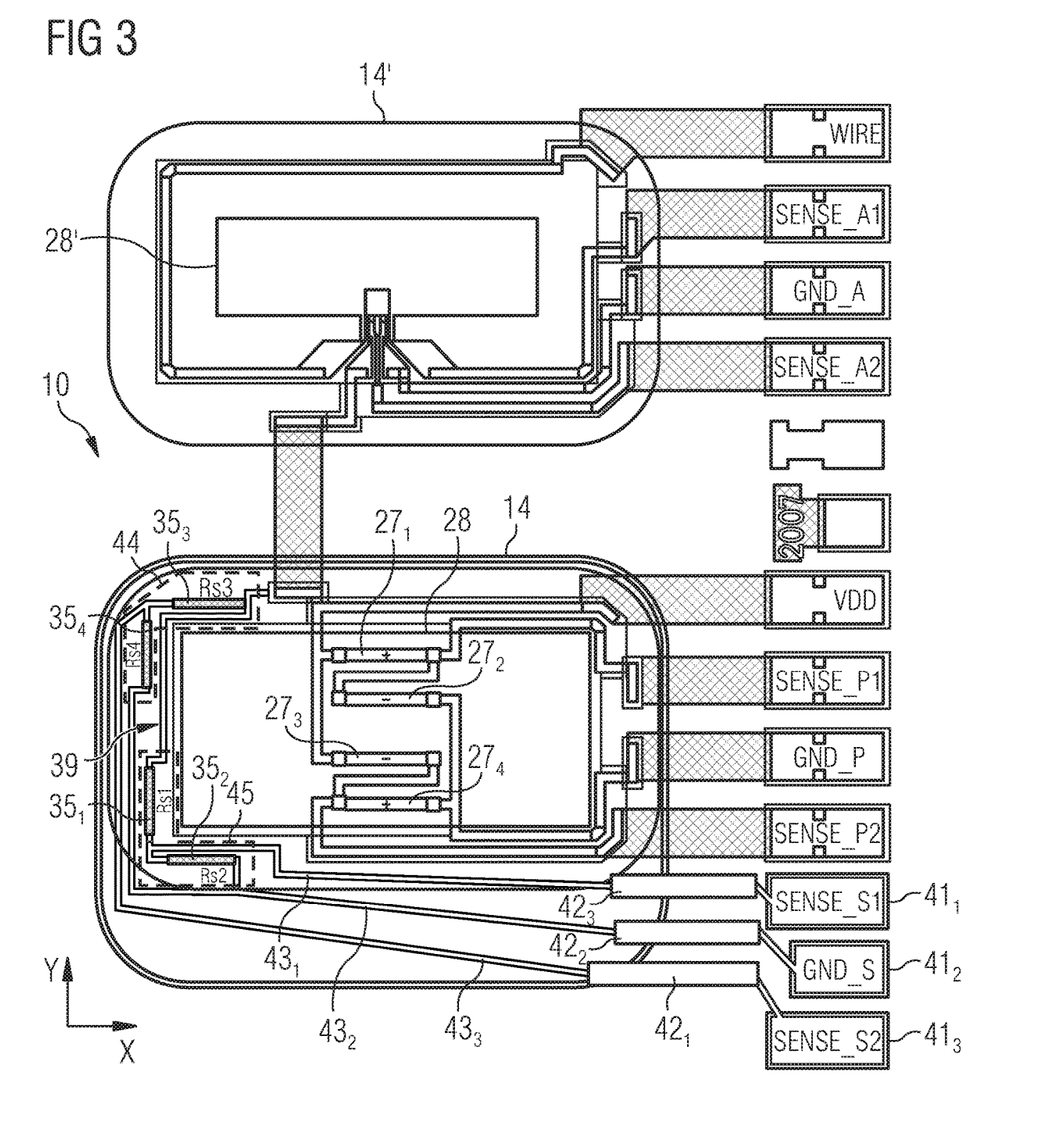
FIG. 3 shows a schematic illustration of a chip layout for use for an apparatus in accordance with an example embodiment.

This will be described in more detail below with reference to FIG. 3. FIG. 3 shows a schematic plan view of a chip layout for an example embodiment of an apparatus 10. The apparatus 10 has the MEMS device 14, which can here again for example be a pressure sensor. Alternatively or additionally, the apparatus 10 can for example also have a second device 14'. The second device 14' can likewise be a MEMS device.

The second device 14' can likewise have a movable measurement structure 28'. The second device 14' can be, for example, an acceleration sensor, wherein the movable measurement structure 28' can be a seismic mass.

As can be seen in the bottom part of FIG. 3, the first measurement arrangement 27 can be arranged at the movable measurement structure 28. In the example of the depicted pressure sensor 14, the first measurement arrangement 27 has four piezoresistive elements $27_1$, $27_2$, $27_3$, $27_4$, which are arranged at the movable diaphragm 28.

By contrast, the second measurement arrangement 35 is arranged at an immovable reference region 39 adjacent to the movable measurement structure 28. The immovable reference region 39 can be an immovable section of the MEMS device 14. In the example of the depicted pressure sensor 14, the second measurement arrangement 35 has four piezoresistive elements $35_1$, $35_2$, $35_3$, $35_4$, which are not arranged at the movable diaphragm 28, but around the movable diaphragm 28 at said same immovable reference section 39.

As can be seen more clearly for example again in FIG. 2B, the immovable reference region 39 can be, for example, a section of the silicon layer 29 and in particular a section of the silicon layer 29 that has not been thinned and is therefore immovable.

It is possible for example with example embodiments of the MEMS device 14, as are described here, to provide disturbance compensation for compensating or reducing mechanical stress, specifically without providing soft or elastic materials for mechanically decoupling the mechanical stress. To this end, the first and the second measurement arrangement 27, 35 can be coupled to a disturbance compensation circuit 13.

In accordance with example embodiments, the disturbance compensation circuit 13 can be configured to compensate mechanical stress that is acting on the MEMS device 14, by way of capturing said mechanical stress by way of the second measurement arrangement 35 and excluding its expected influence on the measurement variable $X_1$ from the measurement variable $X_1$.

In other words, a measurement variable representing the deflection of the diaphragm 28 can be captured by way of the first measurement arrangement 27, e.g. by way of the piezoresistive elements $27_1$, $27_2$, $27_3$, $27_4$ which are depicted by way of example in FIGS. 2B and 3. The diaphragm 28 can be deflected due to the pressure to be captured. The pressure is the useful variable $N_1$ of the measurement variable $X_1$. In the case of (unwanted) mechanical stress acting on the MEMS device 14, the diaphragm 28 can, however, be additionally deflected by a specific amount. Consequently, this deflection would not be induced by the pressure, but by the undesired mechanical stress. This portion of the deflection of the diaphragm 28 can therefore be referred to as the (undesired) first disturbance variable $Z_1$.

The second measurement arrangement 35 is arranged next to the diaphragm 28 at an immovable reference section 39. The piezoresistive elements $35_1$, $35_2$, $35_3$, $35_4$ of the second measurement arrangement 35 consequently directly capture the mechanical stress acting on the MEMS device 14, preferably without also capturing the deflection of the diaphragm 28. That is to say, the second measurement arrangement 35 captures a second measurement variable $X_2$, which can include as a component at least the mechanical stress, which is designated the second disturbance variable $Z_2$.

In other words, the second measurement arrangement 35 can thus have a second number of piezoresistive elements $35_1$, $35_2$, $35_3$, $35_4$, which are configured to capture in the environment around the first measurement arrangement 27 mechanical stress that acts in the region of the first measurement arrangement 27, wherein the mechanical stress that is captured in said environment represents the second disturbance variable $Z_2$.

This second disturbance variable $Z_2$ consequently represents the mechanical stress occurring in the reference region 39. If the second measurement arrangement 35 is arranged as closely as possible to the first measurement arrangement 27, or to the diaphragm 28, the mechanical stress that is acting on the diaphragm 28 (first disturbance variable $Z_1$) can coincide very closely with the mechanical stress that is captured by way of the second measurement arrangement 35 (second disturbance variable $Z_2$). In other words, the first disturbance variable $Z_1$ and the second disturbance variable $Z_2$ can coincide very closely.

In the ideal case, the second measurement arrangement 35 can be arranged relative to the first measurement arrangement 27 such that the first disturbance variable $Z_1$ and the second disturbance variable $Z_2$ are identical. By combination with the disturbance variable $Z_2$, the disturbance variable $Z_1$ could then be excluded completely from the measurement variable $X_1$ by way of the disturbance compensation circuit 13.

Alternatively, however, it could also be conceivable for the second measurement arrangement 35 to be arranged relative to the first measurement arrangement 27 such that the first and the second disturbance variable components $Z_1$, $Z_2$ lie within a tolerance range of ±50%, or of ±10% or of ±1%. In other words, the second disturbance variable component $Z_2$ can deviate from the first disturbance variable component $Z_1$ by ±50%, or by ±10% or by ±1%. This could be caused for example by measurement tolerances, device tolerances and the like.

Figure 4:
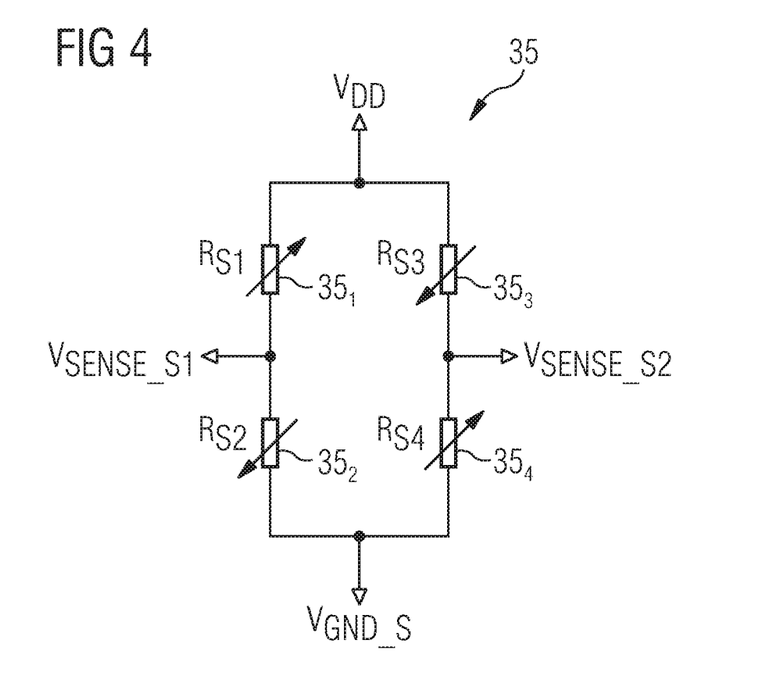
FIG. 4 shows a schematic illustration of a Wheatstone bridge circuit for use in an apparatus in accordance with an example embodiment.

In a conceivable implementation of the second measurement arrangement 35, the second number of piezoresistive elements $35_1$, $35_2$, $35_3$, $35_4$ could be interconnected for example in a Wheatstone bridge circuit, as is schematically shown in FIG. 4. Here, the arrows depicted illustrate the sign of the change of the resistivity upon application of a normal pressure load in the x-direction which is drawn in FIG. 3.

In such an arrangement of the piezoresistive elements $35_1$, $35_2$, $35_3$, $35_4$ in a Wheatstone bridge circuit, three additional connection surfaces could be provided. One connection surface "$V_{GND\_S}$" for selecting and supplying the piezoresistive elements $35_1$, $35_2$, $35_3$, $35_4$ by connection to ground, and two connection surfaces "$V_{SENSE\_S1}$" and "$V_{SENSE\_S2}$" for connecting to a differential amplifier. The positive supply pin "$V_{DD}$" can be shared by the accelerometer 14' and/or the pressure sensor 14 with the result that no additional connection surface would be necessary.

The proposed setup illustrated in FIG. 3 for a sensor chip having for example a pressure sensor 14 is configured to capture a mechanical bulk load in the manner described above. As a reminder, in the embodiment depicted in FIG. 2A, by contrast, the mechanical stress was compensated by mechanical decoupling using soft or elastic material.

In comparison to the embodiment depicted in FIG. 2A, the sensor depicted in FIG. 3 can have additional metal wires, connection surfaces and conductors. Additional metal wires are denoted with the reference signs $43_1$, $43_2$, $43_3$, additional connection surfaces are denoted with the reference signs $42_1$, $42_2$, $42_3$, and additional buried conductors are denoted with the reference signs $41_1$, $41_2$, $41_3$. The piezoresistors RS1-RS4 of the second measurement arrangement 35 are provided with the reference signs $35_1$, $35_2$, $35_3$, $35_4$. Due to the decrease in connection surface area, the influence on the sensor chip size could be reduced.

In the example embodiment depicted in FIG. 3, the piezoresistive elements $35_1$, $35_2$, $35_3$, $35_4$ of the second measurement arrangement 35 are also arranged in a Wheatstone bridge circuit.

The Wheatstone bridge circuit has a first branch 45, in which a first piezoelement $35_1$ and a second piezoelement $35_2$ are arranged in the shape of an L. The Wheatstone bridge circuit furthermore has a second branch 44, in which a third piezoelement $35_3$ and a fourth piezoelement $35_4$ are arranged in the shape of an L.

In accordance with the example embodiment depicted in FIG. 3, the first and the fourth piezoelement $35_1$, $35_4$ are arranged in each case in a manner such that they are oriented in a first direction, and the second and the third piezoelement $35_2$, $35_3$ are arranged in each case in a manner such that they are oriented in a second direction, which differs from the first direction. In this example, the first and the fourth piezoelement $35_1$, $35_4$ are arranged such that they are offset in each case by 90° with respect to the second and third piezoelements $35_2$, $35_3$.

If piezoresistive elements $35_1$, $35_2$, $35_3$, $35_4$ are used in the second measurement arrangement 35, the property of directional dependence thereof can be used in an advantageous manner. In particular if the piezoresistive elements $35_1$, $35_2$, $35_3$, $35_4$ are connected in the form of a Wheatstone bridge and read, this can minimize cross-sensitivity to effects that occur symmetrically at the piezoresistive elements $35_1$, $35_2$, $35_3$, $35_4$. Due to the sensor geometry, mechanical loads can generally act inhomogeneously on the piezoresistive elements $35_1$, $35_2$, $35_3$, $35_4$ and thus influence the sensor output. With the concept described here, the influence of mechanical loads can be minimized.

With respect to the aforementioned directional dependence of the piezoresistive elements $35_1$, $35_2$, $35_3$, $35_4$, for example application of a pressure load in the drawn x-direction (FIG. 3) would by way of the piezoresistive effect increase the resistance value of the first piezoresistive element $35_1$ and of the fourth piezoresistive element $35_4$. At the same time, the resistance value of the second piezoresistive element $35_2$ and of the third piezoresistive element $35_3$ would decrease.

With the aforementioned Wheatstone bridge circuit, a certain pre-compensation of the mechanical stress could thus be performed, for example.

Once again with reference to FIGS. 3 and 4, it could additionally be possible for example when connecting $V_{GND\_S}$ between $V_{SENSE\_S1}$ and $V_{SENSE\_S2}$ to capture a voltage difference which is proportional to the effective mechanical load. By placing the resistors or the piezoresistive elements $35_1$, $35_2$, $35_3$, $35_4$ on the, e.g. left, side of the diaphragm 28, their influence on the depicted pressure sensor 14 and the wiring thereof is minimized. The well-known behaviour of a pressure sensor can consequently remain almost unchanged. However, it should be noted that this setup illustrates only one of multiple possibilities for configuring a load sensor.

Further example embodiments provide a combination of the above-described functions with temperature compensation. For example, a temperature measurement circuit can be used to measure a temperature acting on the first and/or the second measurement arrangement 27, 35. The temperature measurement circuit can be integrated for example in the circuit 23 (e.g. ASIC).

Based on the measured temperature, the temperature measurement circuit can determine a temperature correction factor $T_x$. This temperature correction factor $T_x$ can represent a temperature dependence of the measured first and/or second measurement arrangement 27, 35. In other words, the absolute value of the temperature correction factor $T_x$ can be determined such that it can indicate a temperature-dependent behaviour of the first and/or second measurement arrangement 27, 35 in the form of a mathematical value.

In accordance with example embodiments, the temperature measurement circuit can combine said ascertained temperature correction factor $T_x$ with the second disturbance variable component $Z_2$ and the first measurement variable $X_1$ which is ascertained by way of the first measurement arrangement 27. This would thus produce not only a measurement variable $X_3$ that is reduced or compensated by the second disturbance variable component $Z_2$ but additionally also by the temperature correction factor $T_x$.

In mathematically simplified terms, this would be:

$$X_3 = X_1 - Z_2 - T_x, \text{ wherein } X_1 = N_1 + Z_1$$

The disturbance compensation circuit and the temperature measurement circuit can be formed as individual switching elements or together in an integrated circuit 23, for example an ASIC 23. The disturbance compensation circuit 13 and the measurement arrangements 27, 35 could likewise be implemented in this integrated circuit 23.

Now that example embodiments of the apparatus 10 have been described structurally, what follows is a functional description of the apparatus 10 and a detailed mathematical description of the disturbance compensation, as would be implementable by way of the disturbance compensation circuit 13.

The concept described here thus suggests to omit a glob top process and instead to capture an unwanted mechanical load and correct it. Measuring the mechanical bulk load in the sensor chip can be performed by way of the second measurement arrangement 35, wherein the second measurement arrangement 35 can have, for example, a number of piezoresistive elements $35_1$, $35_2$, $35_3$, $35_4$. The latter in turn can be read for example via a regular measurement interface, which may already be present, for reading the pressure sensor 14.

In order to measure the mechanical bulk load, it is thus possible to use, in addition to a first measurement arrangement 27, a second measurement arrangement 35 with piezoresistive elements $35_1$, $35_2$, $35_3$, $35_4$. The piezoresistive elements $35_1$, $35_2$, $35_3$, $35_4$ should be located at positions $r_i$ in the vicinity of the piezoresistive elements $27_1$, $27_2$, $27_3$, $27_4$ of the first measurement arrangement 27, which capture for example pressure, but should not be subject to loads that occur due to the pressure $p_{in}$ being exerted.

For example, the piezoresistive elements $35_1$, $35_2$, $35_3$, $35_4$ of the second measurement arrangement 35 could accordingly be situated in the vicinity of, but not on, the diaphragm 28 of the pressure sensor 14. The mechanical load σ, which is exerted by unwanted sources, can then be determined by measuring the change in resistivity $\Delta\rho(r_i)$ of said piezoresistive elements $35_1$, $35_2$, $35_3$, $35_4$ of the second measurement arrangement 35. With this information it is possible to compensate the output of the pressure sensor 14 with respect to influences by unwanted mechanical loads.

In one implementation, the dependence $P_{raw} = f(p_{in}, \sigma, X)$ of the output $P_{raw}$ of the pressure sensor 14 on the exerted pressure $p_{in}$, of the mechanical load σ and further parameters X, such as temperature, could be determined. This dependence is what is known as the sensor model function. In accordance with the required precision, this model function f could be determined from calculations, simulations and/or experimental characterization. Subsequently, the relationship for the compensated sensor output $p_{out} = F(P_{raw}, \sigma, X)$ could be obtained by inverting the sensor model function f.

If the compensated sensor function $F(P_{raw}, \sigma, X)$ in this implementation were to behave in a sufficiently calculable fashion and the dependence thereof on the mechanical load σ were sufficiently small, F could be expanded in a Taylor series up to the first order in σ. This would result in the simplest possible compensation formula for mechanical load, given by:

$$P_{out} = F_0 \cdot (P_{raw}, X) + S_\sigma \cdot \sigma$$

wherein $F_0$ denotes the compensation formula without load compensation and $S_\sigma$ is the proportionality coefficient for the cross-sensitivity with respect to mechanical load.

A mechanical load in an elastic solid body can be described by the temporally and spatially varying Coachy stress tensor field, which consists of three normal stress and three shear stress components. Depending on the placement and alignment of the piezoresistive elements $35_1$, $35_2$, $35_3$, $35_4$, different projections or combinations of these components can be captured. In the simplest implementation, only one specific component would be measured, e.g. the normal stress parallel to the current flow through the piezoresistive elements $35_1$, $35_2$, $35_3$, $35_4$ of the pressure sensor 14. However, in other implementations it is just as possible to measure additional components of the mechanical load. Such an improved measurement setup could make possible better load compensation, but would require, for example, additional piezoresistors.

In the remaining paragraphs of this section, a specific implementation is described by way of example. This example is based on the sensor chip shown in FIG. 3, which not only has a pressure sensor 14 but also an accelerometer 14'.

In order to be able to use the information of the second measurement arrangement 35 to correct the output of the pressure sensor 14, the mutual dependencies thereof should be known. Owing to the high symmetry of the depicted pressure sensor 14, a majority of the mechanical load sensitivity can already be addressed by the Wheatstone bridge. In other words, a certain pre-compensation can thus take place here on account of the Wheatstone bridge circuit. The remaining sensitivity with respect to load can therefore be small, such that processing up to the first order in the mechanical load may already be sufficient.

Referring again to FIG. 2B, reference is once again made to the circuit 23 which is depicted there. This circuit 23 can be, for example, an ASIC or another form of integrated circuit (IC). The circuit 23 can have, for example, the disturbance compensation circuit 13. The disturbance compensation circuit 13 can disturbance-compensate the values captured by way of the piezoresistive elements $27_1$, $27_2$, $27_3$, $27_4$ of the first measurement arrangement 27 and those captured by way of the piezoresistive elements $35_1$, $35_2$, $35_3$, $35_4$ of the second measurement arrangement 35 by applying the above formulae 2 and 3. The output would be a correspondingly disturbance-compensated measurement variable $X_{comp}$, as described further above.

In other words, it is possible with the concept described here to compensate the cross-sensitivity of a sensor with respect to unwanted mechanical load by way of a direct measurement of the load itself.

It has already been possible to investigate the influence of the mechanical load on the signal of the pressure sensor 14, which gave the results described in more detail below.

Figure 5A:
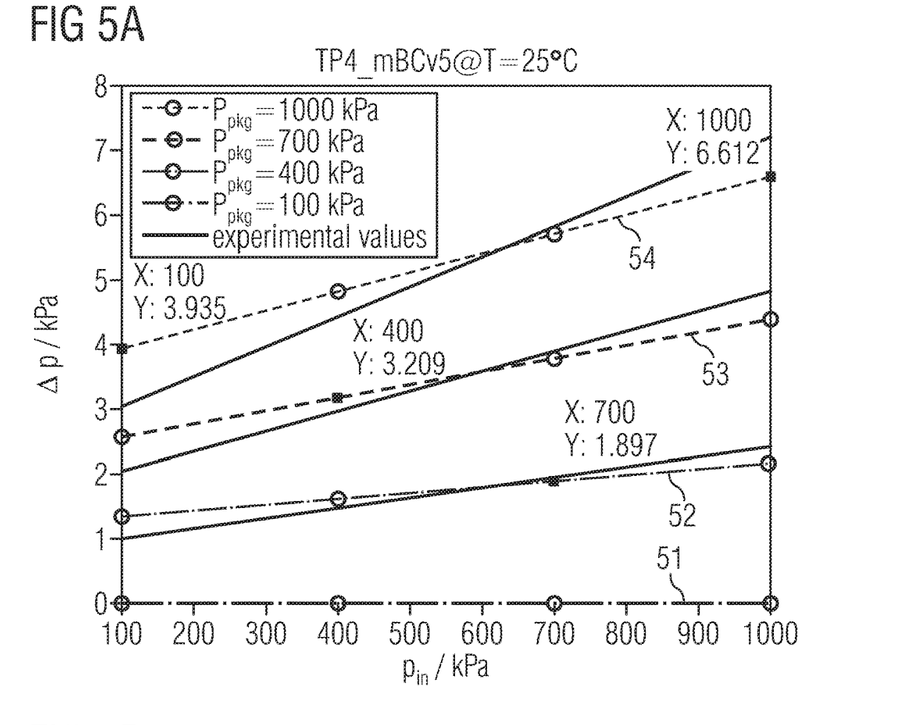
FIG. 5A shows a diagram for illustrating the cross-sensitivity of a pressure sensor with respect to isotropic mechanical compression.
Figure 5B:
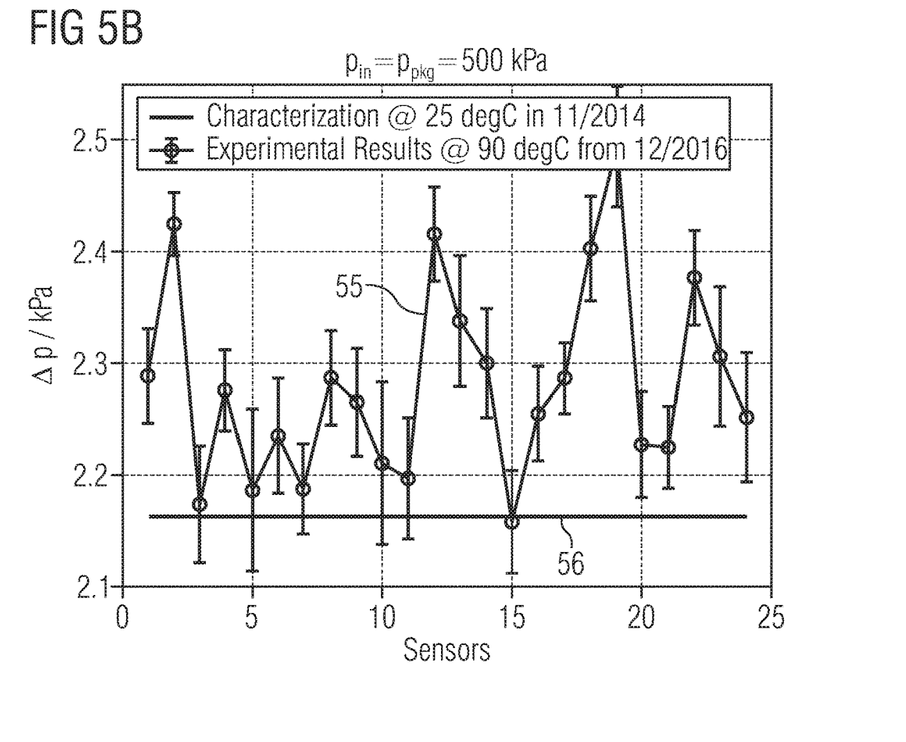
FIG. 5B shows a diagram for illustrating the measurement error for 24 different sensors of a batch as compared to experimentally derived values.

For example, the schematics depicted in FIGS. 5A and 5B show the cross-sensitivity of a sensor chip with respect to an externally exerted mechanical load. This was simulated with FEM (finite element method). The results of the FEM for isotropically exerted external forces was compared to available experimental data, wherein an acceptable match was found.

In particular, the cross-sensitivity of a pressure sensor 14 with respect to externally exerted, isotropic mechanical load $p_{pkg}$ is shown in FIG. 5A. The schematic shows the pressure deviation Δp with respect to the input pressure $p_{in}$, which were obtained from FEM simulations (circles and dotted lines) or experiments (black solid lines).

For example, the curves 51, 52, 53, 54 illustrated in dashed lines in FIG. 5A indicate the results of the FEM calculations, and the curves illustrated in solid lines indicate the experimentally ascertained data. The curve 51 represents a load of 100 kPa, the curve 52 represents a load of 400 kPa, the curve 53 represents a load of 700 kPa and the curve 54 represents a load of 1000 kPa.

The schematic depicted in FIG. 5B shows Δp for 24 different sensors of a current sensor batch (reference sign 55) compared to experimentally derived values from the year 2014 (reference sign 56).

Figure 6A:
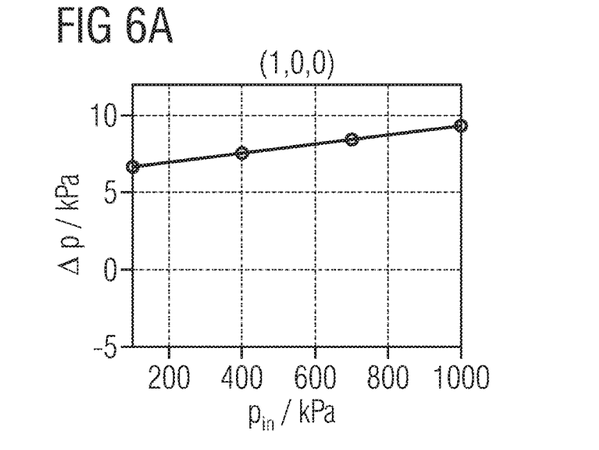
FIG. 6A shows a diagram for illustrating the directional dependence of the cross-sensitivity of a pressure sensor with respect to externally applied normal stress of 900 kPa in the x-direction (1,0,0).
Figure 6B:
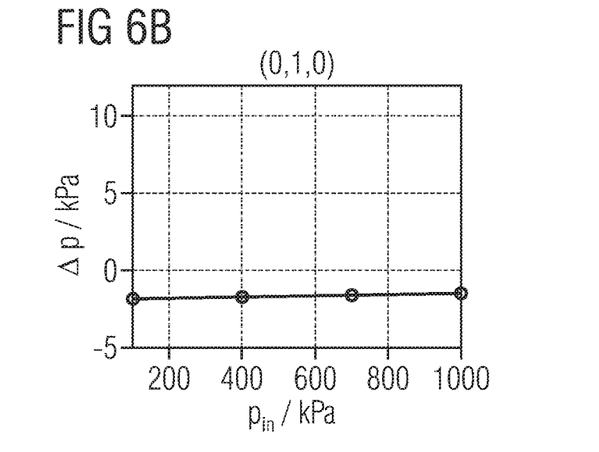
FIG. 6B shows a diagram for illustrating the directional dependence of the cross-sensitivity of a pressure sensor with respect to externally applied normal stress of 900 kPa in the y-direction (0,1,0).
Figure 6C:
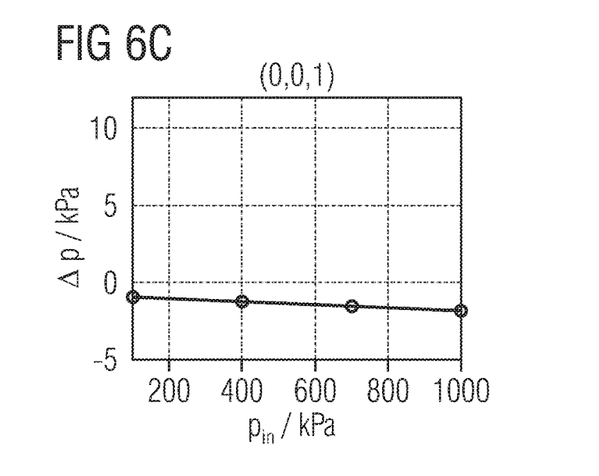
FIG. 6C shows a diagram for illustrating the directional dependence of the cross-sensitivity of a pressure sensor with respect to externally applied normal stress of 900 kPa in the z-direction (0,0,1).

However, it is also possible with FEM simulations for the external forces to be exerted, for example, anisotropically, as is illustrated for example in FIGS. 6A, 6B and 6C. The schematics depicted in FIGS. 6A, 6B and 6C show the directionality of the cross-sensitivity of a pressure sensor 14 with respect to an externally exerted normal load of 900 kPa. FIG. 6A shows this cross-sensitivity in the x-direction (1,0,0), FIG. 6B shows this cross-sensitivity in the y-direction (0,1,0) and FIG. 6C shows this cross-sensitivity in the z-direction (0,0,1). These schematics show the pressure deviation Δp as compared to the input pressure $p_{in}$, which were obtained from FEM simulations.

These results suggest that the cross-sensitivity of the pressure sensor 14 with respect to a mechanical bulk load is the strongest in the x-direction of the sensor 14.

Tire pressure sensors, for example, can utilize capacitive pressure sensors. Although these are not directly influenced by unintended mechanical load, they are affected by minuscule displacements. Via the elasticity of silicon, the mechanical stress produces displacements which can then also affect capacitive pressure sensors.

Of course, applications other than pressure sensors can also be sensitive with respect to mechanical load. For example, each bandgap circuit can be sensitive with respect to mechanical load.

Additional or alternative example embodiments of the present disclosure can be implemented as follows:

In accordance with a first aspect, an apparatus can have the following features: a MEMS device with a first measurement arrangement for capturing a measurement variable based on a physical variable, which has a useful variable component and a first disturbance component, and a second measurement arrangement for capturing a second disturbance variable component, and a disturbance compensation circuit which is configured to combine the second disturbance component and the measurement variable and to obtain a disturbance-compensated measurement variable, wherein the MEMS device is arranged in a housing, and wherein the MEMS device is in immediate mechanical contact with the housing by way of at least 50% of a MEMS device surface.

In accordance with a second aspect, with reference to the first aspect, the housing can comprise a material having a modulus of elasticity of at least 100 MPa.

In accordance with a third aspect, with reference to the first aspect, the MEMS device can be in direct mechanical contact entirely with the housing by way of all MEMS device surfaces.

In accordance with a fourth aspect, with reference to the first aspect, the disturbance compensation circuit can be configured to compensate mechanical stress that is acting on the MEMS device, by way of capturing said mechanical stress by way of the second measurement arrangement and excluding its expected influence on the measurement variable from the latter.

In accordance with a fifth aspect, with reference to the first aspect, it is possible for no additional elastic material for mechanical decoupling of mechanical stress that is acting on the MEMS device to be arranged between the MEMS device and the housing.

In accordance with a sixth aspect, with reference to the first aspect, the MEMS device can have a mechanically deflectable movable measurement structure for capturing the physical variable, and an absolute value of a mechanical deflection of the movable measurement structure can be capturable by way of the first measurement arrangement.

In accordance with a seventh aspect, with reference to the sixth aspect, the first measurement arrangement can be arranged at the movable measurement structure, and the second measurement arrangement can be arranged at an immovable reference region adjacent to the movable measurement structure.

In accordance with an eighth aspect, with reference to the first aspect, the MEMS device can be a pressure sensor.

In accordance with a ninth aspect, with reference to the first aspect, the first measurement arrangement can have a first number of piezoresistive elements.

In accordance with a tenth aspect, with reference to the first aspect, the second measurement arrangement can have a second number of piezoresistive elements, which are configured to capture in the environment around the first measurement arrangement mechanical stress that acts in the region of the first measurement arrangement, wherein the mechanical stress that is captured in the environment represents the second disturbance variable.

In accordance with an eleventh aspect, with reference to the first aspect, the first measurement arrangement can have a first number of piezoresistive elements and the second measurement arrangement can have a second number of piezoresistive elements, wherein the first number of piezoresistive elements is arranged relative to the second number of piezoresistive elements such that the first and the second disturbance components lie within a tolerance range of ±50%, or ±10% or ±1%.

In accordance with a twelfth aspect, with reference to the first aspect, the first measurement arrangement can have a first number of piezoresistive elements and the second measurement arrangement can have a second number of piezoresistive elements, wherein the first number of piezoresistive elements is arranged relative to the second number of piezoresistive elements such that the first and the second disturbance components are identical.

In accordance with a thirteenth aspect, with reference to the tenth aspect, the second number of piezoresistive elements can be connected in a Wheatstone bridge circuit.

In accordance with a fourteenth aspect, with reference to the thirteenth aspect, the Wheatstone bridge circuit can have a first branch, in which a first piezoelement and a second piezoelement are arranged in the shape of an L, and a second branch, in which a third piezoelement and a fourth piezoelement are arranged in the shape of an L.

In accordance with a fifteenth aspect, with reference to the fourteenth aspect, the first and the fourth piezoelement can be arranged in each case in a manner such that they are oriented in a first direction, and the second and the third piezoelement can be arranged in each case in a manner such that they are oriented in a second direction, which differs from the first direction.

In accordance with a sixteenth aspect, with reference to the first aspect, the apparatus can have a temperature measurement circuit which is configured to measure a temperature acting on the first and/or a second measurement arrangement and to determine a temperature correction factor, which represents a temperature dependence of the first and/or second measurement arrangement, and the circuit can be configured to combine the temperature correction factor, the second disturbance component and the measurement variable with one another and to obtain a measurement variable which is reduced by the second disturbance component and the temperature correction factor.

Although some aspects have been described in connection with an apparatus, it is to be understood that said aspects also constitute a description of the corresponding method, with the result that a block or a structural element of an apparatus should also be understood to be a corresponding method step or a feature of a method step. Analogously herewith, aspects which were described in connection with a or as a method step also represent a description of a corresponding block or detail or feature of a corresponding apparatus.

The described apparatus can correspondingly also be understood to be a description of method steps. The described method can likewise correspondingly be understood to be a description of apparatus features. The interchangeability or analogy of method steps and corresponding apparatus features is thus disclosed herein.

Some or all of the method steps can be performed by a hardware apparatus (or using a hardware apparatus), such as a microprocessor, a programmable computer or an electronic circuit. In some example embodiments, some or more of the most important method steps can be performed by such an apparatus.

Depending on the specific implementation requirements, example embodiments can be implemented in hardware or software or at least partially in hardware or at least partially in software. The implementation can be performed using a digital storage medium, for example a floppy disk, a DVD, a Blu-ray disc, a CD, a ROM, a PROM, an EPROM, an EEPROM or a FLASH memory, a hard disk or another magnetic or optical memory, on which electronically readable control signals are stored that can interact or do interact with a programmable computer system such that the respective method is performed. For this reason, the digital storage medium can be computer-readable.

Some example embodiments thus comprise a data carrier which has electronically readable control signals that are capable of interacting with a programmable computer system such that one of the methods described here is performed.

In general, example embodiments can be implemented as a computer program product having a program code, wherein the program code acts to perform a method if the computer program product is executed on a computer.

The program code can also be stored, for example, on a machine-readable carrier.

Other example embodiments comprise the computer program for performing one of the methods described here, wherein the computer program is stored on a machine-readable carrier. In other words, an example embodiment of the disclosed method is thus a computer program which has a program code for performing one of the methods described herein if the computer program is running on a computer.

A further example embodiment of the method is thus a data carrier (or a digital storage medium or computer-readable medium), on which the computer program for performing one of the methods described here is recorded. The data carrier or the digital storage medium or the computer-readable medium are typically tangible and/or non-volatile.

A further example embodiment of the method is thus a data stream or sequence of signals, which represents or represent the computer program for performing one of the methods described herein. The data stream or the sequence of signals can be configured for example so as to be transferred via a data communication connection, for example the Internet.

A further example embodiment comprises a processing device, for example a computer or a programmable logic device, which is configured or adapted for performing one of the methods described herein.

A further example embodiment comprises a computer, on which the computer program for performing one of the methods described herein is installed.

A further example embodiment comprises an apparatus or system, which is designed to transmit a computer program for performing at least one of the methods described herein to a receiver. The transmission can be electronic or optical, for example. The receiver can be, for example, a computer, a mobile device, a storage device or a similar apparatus. The apparatus or the system can comprise, for example, a file server for transmitting the computer program to the receiver.

In some example embodiments, a programmable logic device (for example a field programmable gate array, FPGA) can be used to perform some or all functions of the methods described here. In some example embodiments, a field programmable gate array can act together with a microprocessor to perform one of the methods described herein. In general, the methods in some example embodiments are performed by any desired hardware apparatus. The latter can be universally usable hardware, such as a computer processor (CPU) or hardware that is specific to the method, such as an ASIC.

The above-described example embodiments are merely illustrations of the principles of the present disclosure. It is to be understood that modifications and variations of the arrangements and details described herein will be obvious to another person skilled in the art. For this reason, this disclosure is intended to be limited merely by the scope of protection of the following patent claims rather than by the specific details which have been presented on the basis of the description and the explanation of the example embodiments herein.

What is claimed is:
1. An apparatus comprising:
   a MEMS device comprising:
      a first measurement arrangement for capturing a measurement variable ($X_1$) based on a physical variable, the measurement variable ($X_1$) having a useful variable component ($N_1$) and a first disturbance variable component ($Z_1$), and
      a second measurement arrangement for capturing a second disturbance variable component ($Z_2$), and
      a disturbance compensation circuit configured to reduce the measurement variable ($X_1$) by an absolute value of the second disturbance variable component ($Z_2$) to obtain a disturbance-compensated measurement variable ($X_{comp}$),
      wherein the MEMS device is arranged in a housing, and
      wherein the MEMS device is in immediate mechanical contact with the housing by way of at least 50% of a surface of the MEMS device.

2. The apparatus as claimed in claim 1, wherein the housing has a material having a modulus of elasticity of at least 100 MPa.

3. The apparatus as claimed in claim 1, wherein the MEMS device is in direct mechanical contact entirely with the housing by way of all surfaces of the MEMS device.

4. The apparatus as claimed in claim 1, wherein the disturbance compensation circuit is further configured to:
compensate mechanical stress that is acting on the MEMS device, by capturing the mechanical stress by way of the second measurement arrangement and excluding its expected influence on the measurement variable ($X_1$) from the measurement variable ($X_1$).

5. The apparatus as claimed in claim 1, wherein no additional elastic material for mechanical decoupling of mechanical stress that is acting on the MEMS device is arranged between the MEMS device and the housing.

6. The apparatus as claimed in claim 1, wherein the MEMS device has a mechanically deflectable movable measurement structure for capturing the physical variable, and
wherein an absolute value of a mechanical deflection of the mechanically deflectable movable measurement structure is capturable by way of the first measurement arrangement.

7. The apparatus as claimed in claim 6, wherein the first measurement arrangement is arranged at the mechanically deflectable movable measurement structure, and
wherein the second measurement arrangement is arranged at an immovable reference region adjacent to the mechanically deflectable movable measurement structure.

8. The apparatus as claimed in claim 1, wherein the MEMS device is a pressure sensor.

9. The apparatus as claimed in claim 1, wherein the first measurement arrangement has a first quantity of piezoresistive elements.

10. The apparatus as claimed in claim 9, wherein the second measurement arrangement has a second quantity of piezoresistive elements, which are configured to capture, in an environment around the first measurement arrangement, mechanical stress that acts in a region of the first measurement arrangement, and
wherein the mechanical stress that is captured in the environment represents the second disturbance variable component ($Z_2$).

11. The apparatus as claimed in claim 1, wherein the first measurement arrangement has a first quantity of piezoresistive elements and the second measurement arrangement has a second quantity of piezoresistive elements, and
wherein the first quantity of piezoresistive elements is arranged relative to the second quantity of piezoresistive elements such that the first disturbance variable component ($Z_1$) and the second disturbance variable component ($Z_2$) lie within a tolerance range of ±50%, ±10%, or ±1%.

12. The apparatus as claimed in claim 11, wherein the second quantity of piezoresistive elements are connected in a Wheatstone bridge circuit.

13. The apparatus as claimed in claim 12, wherein the Wheatstone bridge circuit has a first branch, in which a first piezoresistive element and a second piezoresistive element are arranged in a shape of an L, and a second branch, in which a third piezoresistive element and a fourth piezoresistive element are arranged in the shape of an L.

14. The apparatus as claimed in claim 13, wherein the first piezoresistive element and the fourth piezoresistive element are arranged in a manner such that the first piezoresistive element and the fourth piezoresistive element are oriented in a first direction,
wherein the second piezoresistive element and the third piezoresistive element are arranged in each case in a manner such that the second piezoresistive element and the third piezoresistive element are oriented in a second direction, which differs from the first direction.

15. The apparatus as claimed in claim 1, wherein the first measurement arrangement has a first quantity of piezoresistive elements and the second measurement arrangement has a second quantity of piezoresistive elements, and
wherein the first quantity of piezoresistive elements is arranged relative to the second quantity of piezoresistive elements such that the first disturbance variable component ($Z_1$) and the second disturbance variable component ($Z_2$) are identical.

16. The apparatus as claimed in claim 1, further comprising:
a temperature measurement circuit configured to:
measure a temperature acting on the first measurement arrangement and/or the second measurement arrangement,
determine a temperature correction factor ($T_x$),
wherein the temperature correction factor ($T_x$) represents a temperature dependence of the first measurement arrangement and/or the second measurement arrangement, and
combine the temperature correction factor ($T_x$), the second disturbance variable component ($Z_2$), and the measurement variable ($X_1$) to obtain a measurement variable ($X_3$).

17. An apparatus comprising:
a pressure sensor comprising:
a first measurement arrangement to capture a measurement variable ($X_1$) based on a physical variable, the measurement variable ($X_1$) having a useful variable component ($N_1$) and a first disturbance variable component ($Z_1$),
a second measurement arrangement to capture a second disturbance variable component ($Z_2$), and
a disturbance compensation circuit configured to reduce the measurement variable ($X_1$) by an absolute value of the second disturbance variable component ($Z_2$) to obtain a disturbance-compensated measurement variable ($X_{comp}$),
wherein the pressure sensor is arranged in a housing, and
wherein the pressure sensor is in immediate mechanical contact with the housing by way of at least 50% of a surface of the pressure sensor.

18. An apparatus comprising:
a pressure sensor comprising:
a first set of piezoresistive elements to capture a measurement variable ($X_1$) based on a physical variable, the measurement variable ($X_1$) having a useful variable component ($N_1$) and a first disturbance variable component ($Z_1$),
a second set of piezoresistive elements to capture a second disturbance variable component ($Z_2$), and
a disturbance compensation circuit configured to reduce the measurement variable ($X_1$) by an absolute value of the second disturbance variable component ($Z_2$) to obtain a disturbance-compensated measurement variable ($X_{comp}$),
wherein the pressure sensor is arranged in a housing, and
wherein the pressure sensor is in immediate mechanical contact with the housing by way of a surface of the pressure sensor.

19. The apparatus as claimed in claim 18, wherein the first set of piezoresistive elements is arranged relative to the second set of piezoresistive elements such that the first disturbance variable component ($Z_1$) and the second disturbance variable component ($Z_2$) lie within a tolerance range of ±50%, ±10% or ±1%.

20. The apparatus as claimed in claim 18, wherein the first set of piezoresistive elements is arranged relative to the second set of piezoresistive elements such that the first disturbance variable component ($Z_1$) and the second disturbance variable component ($Z_2$) are identical.

* * * * *